United States Patent [19]

Rendell et al.

[11] 4,284,606

[45] Aug. 18, 1981

[54] EXTRACTION

[75] Inventors: John S. Rendell, Stanford-le-Hope; Maurice J. Cahalan, Whitchurch, both of England

[73] Assignee: RTL Contactor Holding S.A., Zug, Switzerland

[21] Appl. No.: 963,776

[22] Filed: Nov. 27, 1978

[30] Foreign Application Priority Data

Nov. 25, 1977 [GB] United Kingdom ............... 49179/77

[51] Int. Cl.³ ...................... C01G 43/00; C01B 25/01
[52] U.S. Cl. ........................................... 423/6; 423/7;
 423/10; 423/319; 423/321 R
[58] Field of Search ............. 423/6, 7, 10, 319, 321 R,
 423/321 S

[56] References Cited

U.S. PATENT DOCUMENTS

| 3,649,209 | 3/1972 | Coleby | 422/269 |
| 4,035,292 | 7/1977 | Himsley | 423/6 |

FOREIGN PATENT DOCUMENTS 2352062 1/1978 France ........................ 423/10

Primary Examiner—Brooks H. Hunt
Attorney, Agent, or Firm—Bernard & Brown

[57] ABSTRACT

A process as described for extracting at least two desired constituents from a mineral using a liquid reagent which produces the constituents, or compounds thereof, in separable form and independently extracting those constituents, or compounds thereof. The process if especially valuable for the extraction of phosphoric acid and metal values, such as uranium from phosphate rock.

10 Claims, 2 Drawing Figures

EXTRACTION

BACKGROUND OF THE INVENTION

This invention relates to the extraction of desired constituents from minerals and is particularly, concerned with the extraction of phosphoric acid and metal values from phosphate rock.

When phosphate rock is acidulated for the production of phosphoric acid, and a liquid/solids separation is performed on the resulting slurry, an appreciable proportion of the phosphoric acid is lost with the solids. A similar proportion of uranium contained in the slurry is also lost with the solids, thus reducing the yield, if a uranium extraction is to be performed.

OBJECTS OF THE INVENTION

It is an object of the present invention to reduce the loss of phosphoric acid with the solids. It is a further object of the present invention to reduce the loss of metal values such as uranium with the solids.

In the present invention, extraction is performed on a slurry resulting from the treatment of a mineral with a liquid reagent before a liquid/solids separation takes place, so that at least a proportion of a desired constituent or constituents of the slurry which would otherwise be lost with the solids may be recovered. These and other objects of the invention will appear from the following description and claims.

SUMMARY OF THE INVENTION

The invention resides in a process for the treatment of phosphate rock, comprising the steps of acidulating the rock to convert the phosphate of the rock into phosphoric acid; contacting a slurry of the acidulated rock with selective extractants for phosphoric acid and metal values contained in the slurry; removing the extractants substantially independently of the solids of the slurry; and recovering the phosphoric acid and the metal values.

DESCRIPTION OF THE PREFERRED EMBODIMENTS

Figure 1:
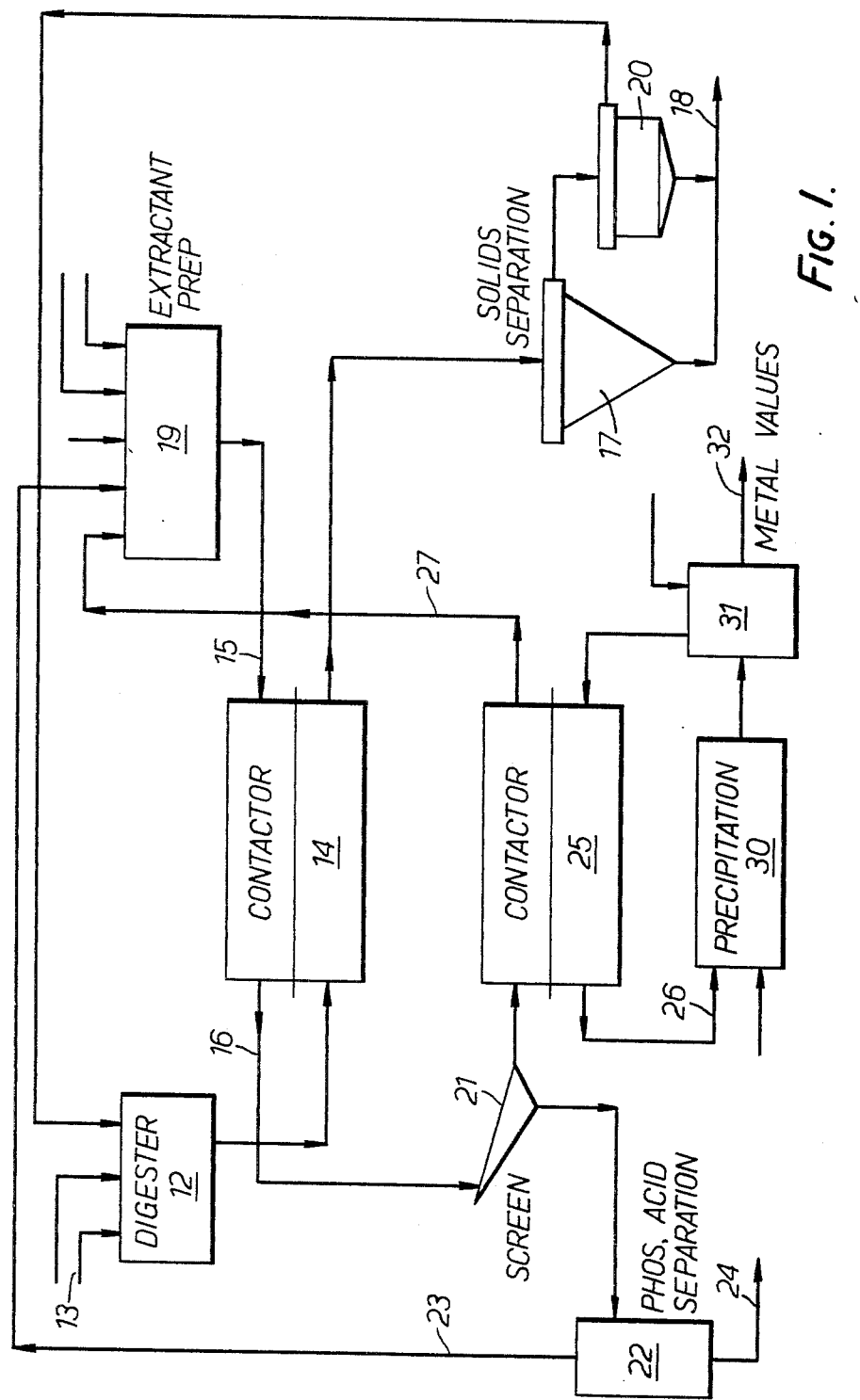
FIG. 1 is a flow diagram of a process in accordance with the invention in which the extractions are performed simultaneously.

Preferably, the phosphoric acid and the metal values are extracted simultaneously, by passing the slurry through a contactor, through which passes an extractant stream which includes selective extractants for phosphoric acid and the metal values. The slurry and the extractant stream preferably pass through the contactor countercurrent, and in substantially separate phases. During the passage of the slurry through the contactor, it may be repeatedly showered through the extractant stream. Suitable contactors are of the type described in U.S. Pat. No. 3,649,209.

The extractants may be mutually immiscible liquids which are also immiscible with the aqueous phase in the contactor. Alternatively, one of the extractants may be solid, e.g. a light-weight particulate ion-exchange resin for the metal ions. The two extractants and the phosphoric acid must further be compatible.

The invention will be more readily understood by way of example from the following description of a process for obtaining phosphoric acid from phosphate rock and for extracting uranium contained in small proportions in the rock, reference being made to the accompanying drawings.

The phosphate rock is milled and is introduced as a slurry into a digester 12 which is also supplied with sulphuric acid on line 13. The acidulation of the rock and outgassing are completed in the digester 12. The acidified rock, in the form of a slurry of the solids, phosphoric acid, excess sulphuric acid and calcium sulphate, is fed into a contactor 14 which is of the type described in U.S. Pat. No. 3,649,209, and through which the slurry continuously passes from left to right in FIG. 1. A countercurrent extractant stream introduced on line 15 from extractant preparation unit 19 passes through the contactor 14 from right to left and leaves the contactor on line 16.

The extractant stream introduced on line 15 contains two extractants—one for phosphoric acid and the other for the contained uranium values in the slurry. The phosphoric acid extractant may be any material known for the purpose, but is preferably a lower alcohol, such as n-butyl alcohol. The uranium extractant is preferably an ion-exchange resin in light-weight particulate form, capable of capturing the uranyl ions from the slurry from digester 12. The extractant stream as a whole is immiscible with the aqueous phase of the slurry and has a lower density than that phase, so that the extractant stream and the slurry tend to move through contactor 14 in separate phases.

As described in the above mentioned U.S. specification, the contactor has rotary buckets which, as the slurry passes through the contactor, repeatedly pick up the slurry and showers it through the extractant stream. On the downward movement of each bucket, extractant is taken down into the aqueous phase and released to float upwardly. Consequently, intimate contact between the two phases is achieved without undue agitation and the phosphoric acid becomes dissolved in its extractant, while the uranium values are captured by the ion exchange resin.

The solids of the slurry together with non-extracted aqueous constituents of that slurry are discharged to a cone-type separator 17; the solids from separator 17 are discharged on line 18, while the liquid component, consisting predominantly of aqueous sulphuric acid, is passed to a clarifier 20 and thence is recycled to the digester 12.

The extractant stream leaving the contactor 14 on line 16 is fed to a sieve-type separator 21, which separates the particulate ion exchange resin from the alcohol-phosphoric acid complex. The latter is treated in unit 22 in order to recover the alcohol, which is recycled on line 23 to the extractant preparation unit 19, while the phosphoric acid is delivered on line 24. The unit 22 is preferably a distillation column which may operate under reduced pressure.

The ion exchange resin from separator 21 is fed into a regenerator 25 which may be a second contactor preferably similar to contactor 14 and to which is fed in countercurrent a stream eluant, which regenerates the ion exchange resin and is discharged on line 26 with the recovered uranium. The regenerated ion exchange resin is recycled on line 27 to the extractant preparation unit 19. After leaving the regenerator 25, the eluant stream on line 26 is processed for the recovery of the uranium values, as by being treated with a reagent on line 28 causing precipitation in vessel 30; the precipitate is separated in separator 31, the eluant being recycled to regenerator 25 and the recovered uranium values being removed from line 32.

Where the extractant for the uranyl ions is a liquid, the sieve-type separator 21 is replaced by an appropriate liquid-liquid separator, such as a mixer-settler.

Because of the efficiency of the contactor 14, substantially all the phosphoric acid of the slurry, including that carried in contact with the solids, is extracted by the alcohol, and the tailings discharged on line 18 contains no significant amount of phosphoric acid, although a small amount of sulphuric acid may be lost with them. If, however, a liquid/solids separator of the slurry from digester 12 had taken place and only the liquid fed into contactor 14, a substantial proportion of the phosphoric acid would have been lost from the process with the solids; a similar proportion of the contained uranium values would have been lost at the same time. The process as described has an enhanced yield and, because extraction of the phosphoric acid and the metal values is effected simultaneously, only a single contactor is required.

Figure 2:
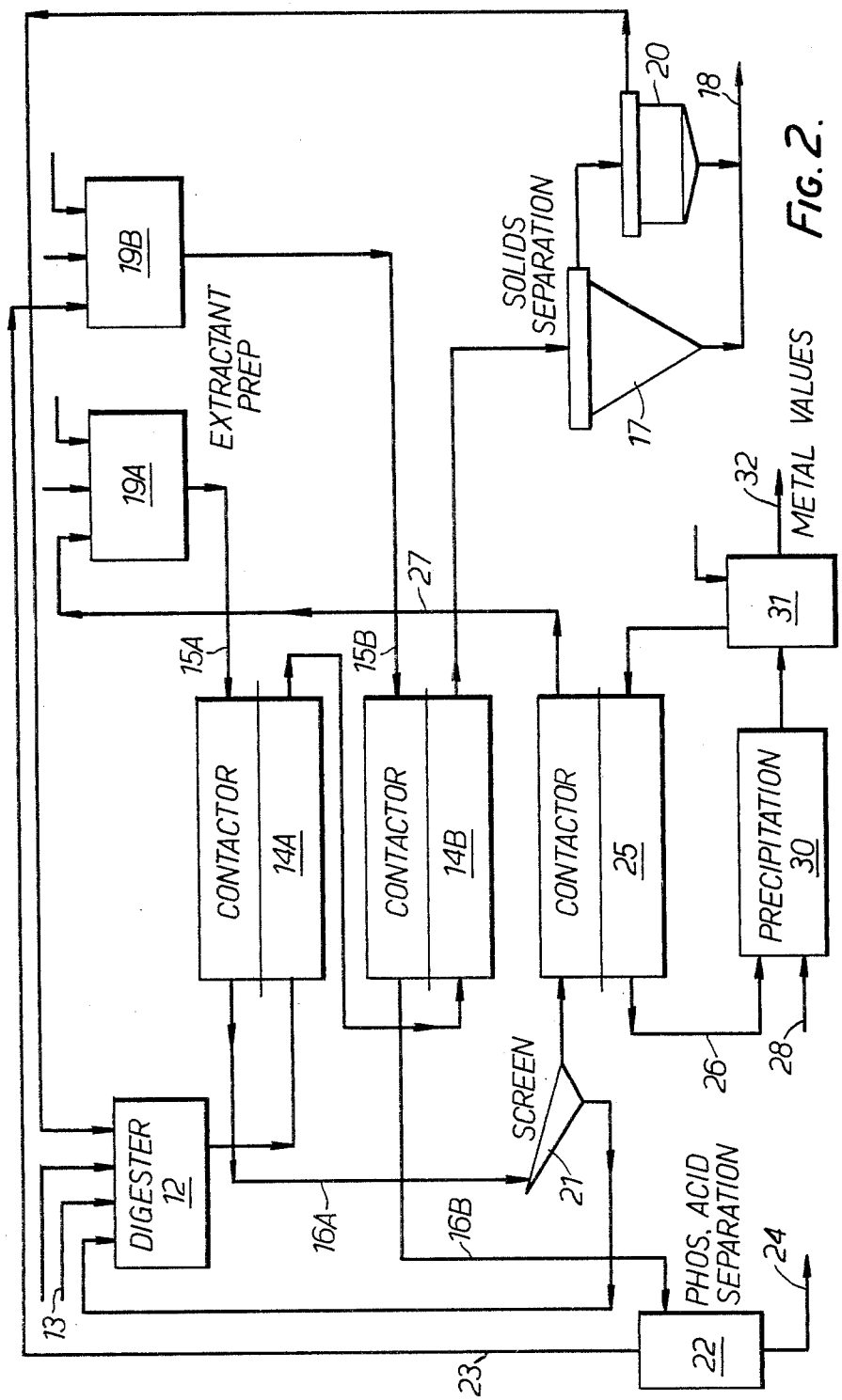
FIG. 2 is a flow diagram of a process in accordance with the invention in which the extractions are performed sequentially.

Although the simultaneous extraction of the phosphoric acid and uranium values is preferred from the point of view of economy of equipment, the two extractions may be performed sequentially as illustrated in FIG. 2, where components similar to those of FIG. 1 are given similar reference numerals.

In FIG. 2, two contactors 14A and 14B take the place of contactor 14 of FIG. 1, being similar in construction to the latter. The slurry from digester 12 passes through the contactor in series and uranium extractant from preparation unit 19A passes via line 15A into contactor 14A and moves through that contactor in countercurrent to the slurry. Similarly, phosphoric acid extractant from preparation unit 19B and line 15B passes through contactor 14B, again in countercurrent to the slurry. The extractant stream from contactor 14A with extracted uranyl values passes on line 16A to screen separator 21 and regenerator 25, the regenerated extractant being recycled to unit 19A; the liquid of the extractant stream on line 16A and separated by screen-separator 21 is fed back to digester 12. The extractant stream from contactor 14B is led directly to separator 22, the separated extractant being returned to preparation unit 19B.

While the above description has been limited to the treatment of phosphate rock, the process can be applied to other minerals of which two or more desired constituents are to be separately removed. The selective extractants employed are those appropriate to the desired constituents.

We claim:

1. A process for the extraction of phosphoric acid and metal values from phosphate rock comprising
    acidulating the phosphate rock to convert the phosphate of the rock into phosphoric acid;
    contacting a slurry of the acidulated rock with selective extractants for phosphoric acid and metal values contained in the slurry;
    removing the extractants substantially independently of the solids of the slurry; and
    recovering the phosphoric acid and metal values.

2. A process according to claim 1, wherein said phosphoric acid and metal values are extracted simultaneously.

3. A process according to claim 1, wherein the phosphoric acid and metal values are extracted from the slurry by passing the slurry and selective extractants for said phosphoric acid and metal values in countercurrent in substantially separate phases, while causing the slurry to be repeatedly showered through the extractant stream.

4. A process according to claim 1, wherein the extractants are mutually immiscible liquids which are also immiscible with the aqueous phase in the contactor.

5. A process according to claim 1, wherein the extractant for the metal values is a lightweight particulate ion-exchange resin.

6. A process according to claim 1, wherein the phosphate rock is acidulated with sulphuric acid.

7. A process according to claim 1, wherein the phosphoric acid is extracted with n-butyl alcohol.

8. A process for the extraction of phosphoric acid and uranium values from phosphate rock comprising:
    acidulating the phosphate rock with sulphuric acid to convert the phosphate of the rock into phosphoric acid;
    contacting a slurry of the acidulated rock with n-butyl alcohol as extractant for phosphoric acid and the lightweight particulate ion-exchange resin capable of capturing uranyl ions by passing the slurry and extractants in countercurrent in substantially separate phases, while causing the slurry to be repeatedly showered through the extractant stream;
    removing the extractants substantially independently of the solids of the slurry; and
    recovering the phosphoric acid and uranium values.

9. Phosphoric acid and metal values when extracted from phosphate rock by the process of claim 1.

10. Phosphoric acid and uranium values when extracted from phosphate rock by the process of claim 8.

* * * * *

UNITED STATES PATENT OFFICE
CERTIFICATE OF CORRECTION

Patent No. 4,284,606　　　　　　　Dated August 18, 1981

Inventor(s) John S. Randall and Maurice J. Cahalan

It is certified that error appears in the above-identified patent and that said Letters Patent are hereby corrected as shown below:

On the title page, correct the spelling of the first named inventor from "John S. Rendell" to --John S. Rendall--.

Signed and Sealed this

Fifteenth Day of December 1981

|SEAL|

Attest:

Attesting Officer

GERALD J. MOSSINGHOFF

Commissioner of Patents and Trademarks